June 13, 1944.  A. RAFTER  2,351,148

VARIABLE SPEED UNIT

Filed April 14, 1942  2 Sheets-Sheet 1

INVENTOR
Albert Rafter
BY
Max O. Fischer
ATTORNEY

June 13, 1944.     A. RAFTER     2,351,148
VARIABLE SPEED UNIT
Filed April 14, 1942     2 Sheets-Sheet 2

INVENTOR
Albert Rafter
BY Frak C Fischer
ATTORNEY

Patented June 13, 1944

2,351,148

UNITED STATES PATENT OFFICE 2,351,148

VARIABLE SPEED UNIT

Albert Rafter, Glen Ridge, N. J., assignor to Rafter Machine Company, Belleville, N. J., a partnership of New Jersey Application April 14, 1942, Serial No. 438,961

3 Claims. (Cl. 74—230.17)

This invention relates to variable speed units, and more particularly to the provision of a simple structure for automatically adjusting elements of such units.

Variable speed units of the type herein considered embody a plurality of expansible pulleys, or movable sheaves, having bevelled faces engaging tapered belts. The variations in speed are attained by adjusting the effective diameters of the pulleys engaging the belts by expanding or contracting the pulleys by moving the sheaves of the pulleys laterally.

Heretofore, various devices have been employed for laterally moving the sheaves of the pulleys. However, such adjusting devices have been complicated in that they embodied the use of springs, levers, etc., which increased materially the cost of the structure.

It is, therefore, an object of this invention to provide in a variable speed unit a simple arrangement by means of which the parts of the unit can be automatically adjusted without the use of springs, and associated levers.

A further object of the invention is the provision of a variable speed unit in which the driven shaft is in alinement with the driving shaft which enables a compact structure adapted for use in many situations requiring variable speed drives.

A further object is the provision of a variable speed unit including a plurality of expansible pulleys with elements capable of being quickly and automatically adjusted to obtain various pitch diameters of the pulleys and corresponding varying speeds.

Figure 1:
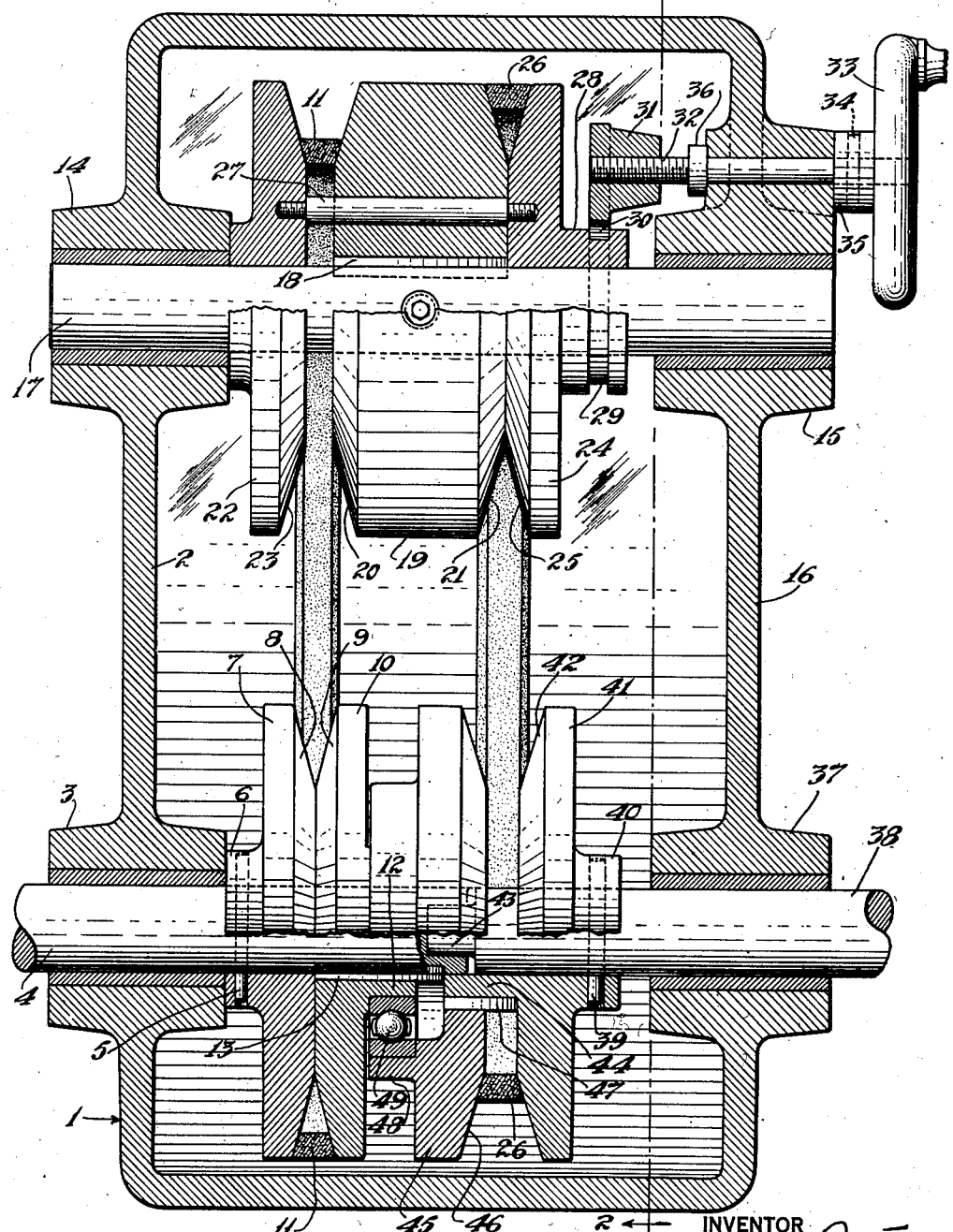
Figure 2:
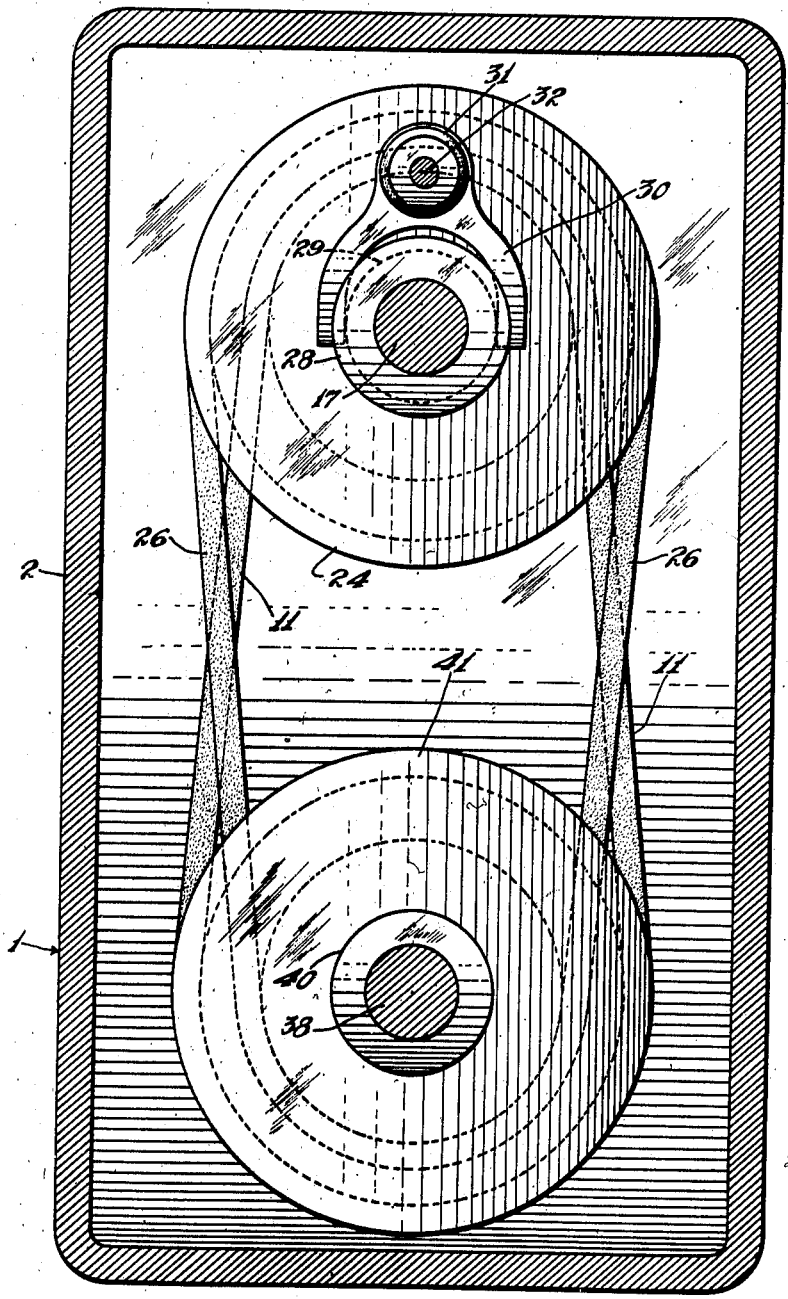

These and other advantageous objects, which will later appear, are accomplished by the simple and practical construction and arrangement of parts hereinafter described and exhibited in the accompanying drawings, forming part hereof, and in which:

Fig. 1 is an elevational view, partly in section, of a variable speed unit embodying the invention, and Fig. 2 is an end view of the unit, taken partly in section, on line 2—2 of Fig. 1.

Referring to the drawings, the variable speed unit is shown to comprise a casing 1, having a wall 2 thereof provided with a bearing 3, through which passes a driving shaft 4, connected to a motor or the like (not shown). Fixed to shaft 4 by means of pin 5 is a collar 6 integral with a sheave 7 having a bevelled face 8 which cooperates with the bevelled face 9 of a sheave 10 to act upon a tapered belt 11. The sheave 10 has its hub 12 keyed at 13 to shaft 4 so that the sheave 10 can be moved laterally towards and away from sheave 7.

Passing through bearings 14 and 15 in the walls 2 and 16 of the casing is a shaft 17. Keyed to shaft 17 at 18 is a central sheave 19 having opposite bevelled faces 20 and 21. Loosely and rotatably mounted on shaft 17 is a sheave 22 having a bevelled face 23 cooperating with bevelled face 20 to act on belt 11.

Loosely and rotatably mounted on shaft 17 on the opposite side of sheave 19 is a sheave 24 having a bevelled face 25 cooperating with bevelled face 21 to act on a tapered belt 26. Passing through sheave 19 is a bolt 27 to which is secured sheaves 22 and 24, so that the two sheaves can be moved laterally together in the same direction. Integral with sheave 24 is a collar 28 having a peripheral groove 29 in which is positioned a fork 30 integral with a hub 31 which threadedly engages a shaft 32 passing through wall 16 and an extension of bearing 15, and having attached thereto a hand wheel 33 by means of a pin 34. The hub 35 for the hand wheel abuts the bearing 15, and together with nut 36 prevents longitudinal movement of shaft 32.

Passing through a bearing 37 in wall 16 is a driven shaft 38 to which is secured by means of pin 39 the hub 40 of a sheave 41 having a bevelled face 42, engaging the belt 26.

The shaft 38 has a reduced portion 43 loosely positioned in a recess in the end of shaft 4. The hub of sheave 41 has an extension 44 to which is keyed at 47 a sheave 45 having a bevelled face 46 engaging belt 26 to enable the sheave 45 to be moved laterally towards or away from sheave 41. The sheave 45 has a hub 48 which is rotatably mounted on hub 12 by means of ball bearings 49.

In operation, to vary the speed, the hand wheel 33 is rotated to move the sheaves 22 and 24 laterally. For example, if the sheaves are moved to the left, the effective diameter of the pulley formed by faces 20 and 23 will be decreased and the effective diameter of the pulley formed by faces 21 and 25 will be increased, causing a tightening or pull on belt 26 and a loosening of belt 11. The pull on belt 26 urges sheave 45 to the left thus decreasing the diameter of the pulley formed by faces 42 and 46. At the same time faces 8 and 9 will be moved towards each other thus increasing the diameter of the pulley formed thereby. By such an adjustment, the speed of the driven shaft is increased. Similarly, by operating the hand wheel to move sheaves 22 and 24 to the right, the speed of the driven shaft 38 will be decreased.

From the above description, it will be seen that there has been provided a variable speed unit by means of which fine adjustments of speed can be attained. The unit is compact, sturdy and accurate, requiring no springs or levers, etc., which might affect the accuracy after a period of use and increase the cost of manufacture.

Although I have shown two V-belts which automatically adjust and control the sheaves, it is obvious that a plurality of belts and a plurality of sheaves could be employed to get any desired ratio and any desired speed or torque on the driven shaft.

The foregoing disclosure is to be regarded as descriptive and illustrative only, and not as restrictive or limitative of the invention, of which obviously, many embodiments may be constructed, including many modifications, without departing from the spirit and scope of the invention herein set forth and denoted in the appended claims.

Having thus described my invention, what I claim as new and desire to secure by Letters Patent, is:

1. In a variable speed unit, a casing, a driving shaft and a driven shaft rotatably supported in said casing in alignment with each other, a sheave fixed to said driving shaft and a sheave fixed to said driven shaft, a sheave keyed to one of said shafts for rotation therewith and for lateral movement thereon relative to the fixed sheave, a sheave keyed to the other fixed sheave for lateral movement thereon relative thereto, hubs on said keyed sheaves disposed toward each other in overlapping spaced relation, and bearing means interposed between said overlapping portions to cooperate in the relative rotation thereof.

2. In a variable speed unit, a casing, a driving shaft and a driven shaft rotatably supported in said casing in alignment with each other, a sheave fixed to said driving shaft and a sheave fixed to said driven shaft, a sheave keyed to one of said shafts for rotation therewith and for lateral movement thereon relative to the fixed sheave, a sheave keyed to the other fixed sheave for lateral movement thereon relative thereto, hubs on said keyed sheaves disposed toward each other in overlapping relation, and means interposed between said overlapping portions to cooperate in the relative rotation thereof.

3. In a variable speed unit, a casing, a driving shaft and a driven shaft rotatably supported in said casing in alignment with each other, a sheave fixed to said driving shaft and a sheave fixed to said driven shaft, a sheave keyed to one of said shafts for rotation therewith and for lateral movement thereon relative to the fixed sheave, a sheave keyed to the other fixed sheave for lateral movement thereon relative thereto, hubs on said keyed sheaves and overlapping portions on said hubs for cooperative engagement in the relative rotation of said hubs.

ALBERT RAFTER.